United States Patent
Arnold et al.

(10) Patent No.: US 9,699,956 B2
(45) Date of Patent: Jul. 11, 2017

(54) DUST PARTICLES SEPARATOR FOR SEEDING MACHINE

(71) Applicant: BAYER INTELLECTUAL PROPERTY GMBH, Monheim (DE)

(72) Inventors: Adrian Christopher Arnold, Brentor (GB); Lubos Vrbka, Langenfeld (DE); Charles Andrew Chapple, Langenfeld (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 14/383,794

(22) PCT Filed: Mar. 12, 2013

(86) PCT No.: PCT/EP2013/054997
§ 371 (c)(1),
(2) Date: Sep. 8, 2014

(87) PCT Pub. No.: WO2013/139643
PCT Pub. Date: Sep. 26, 2013

(65) Prior Publication Data
US 2015/0101518 A1    Apr. 16, 2015

(30) Foreign Application Priority Data

Mar. 22, 2012 (DE) .................... 20 2012 101 029 U
Mar. 22, 2012 (EP) ..................................... 12160851

(51) Int. Cl.
*A01C 7/04* (2006.01)
*A01C 7/20* (2006.01)
(Continued)

(52) U.S. Cl.
CPC ............. *A01C 7/082* (2013.01); *A01B 49/06* (2013.01); *A01C 7/042* (2013.01); *A01C 21/00* (2013.01)

(58) Field of Classification Search
CPC ........... A01C 7/04; A01C 7/042; A01C 7/082; A01C 21/00
(Continued)

(56) References Cited

U.S. PATENT DOCUMENTS 3,860,146 A * 1/1975 Bauman ................. A01C 7/044
221/168
7,509,915 B2   3/2009 Memory
(Continued)

FOREIGN PATENT DOCUMENTS

DE         19837757 A1    2/2000
DE      102008037782 A1    2/2010
(Continued)

OTHER PUBLICATIONS

International Search Report for PCT/EP2013/054997, mailed Jun. 17, 2013.

*Primary Examiner* — John G Weiss
(74) *Attorney, Agent, or Firm* — Pauley Erickson & Kottis

(57) ABSTRACT

A seeding machine (1) and method of use, for introducing seed material into a soil (11), with a first ploughing device for drawing at least one furrow into the soil and a filling device for closing the first furrow. A dust separator (5) separates air during the seeding process into an air component (13) and a dust component (7). A line from the dust separator delivers the dust component separated from the air component into the soil.

18 Claims, 1 Drawing Sheet

Figure 1:
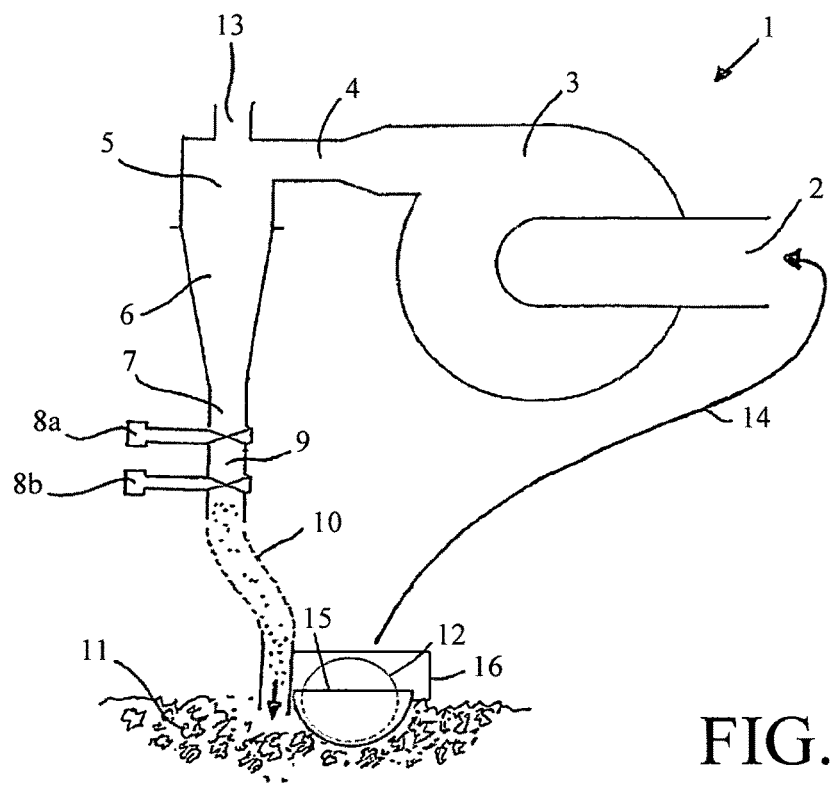
Figure 2:
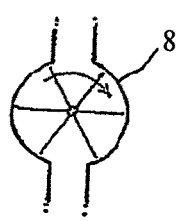
Figure 3:
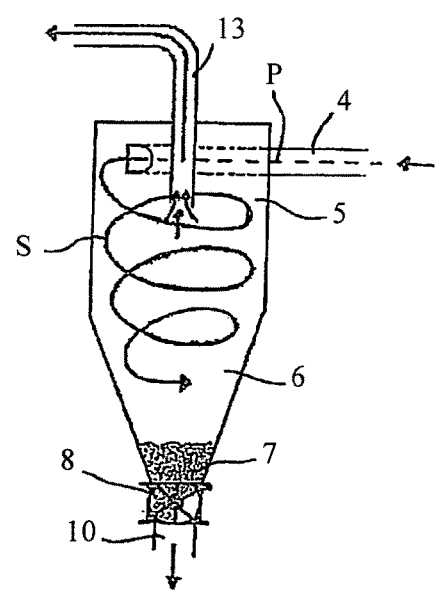

(51) Int. Cl.
*A01C 7/08* (2006.01)
*A01B 49/06* (2006.01)
*A01C 21/00* (2006.01)

(58) Field of Classification Search
USPC .............................. 111/73, 80, 174–176, 185
See application file for complete search history.

(56) References Cited

U.S. PATENT DOCUMENTS

| | | | | |
|---|---|---|---|---|
| 2002/0144637 | A1* | 10/2002 | Wendling | A01C 7/082 111/163 |
| 2008/0121154 | A1* | 5/2008 | Memory | A01C 7/082 111/174 |
| 2014/0216991 | A1* | 8/2014 | Suhin | B07B 4/02 209/644 |
| 2015/0282422 | A1* | 10/2015 | Hahn | A01C 7/20 111/185 |

FOREIGN PATENT DOCUMENTS

| | | |
|---|---|---|
| EP | 0 080 912 A1 | 6/1983 |
| EP | 1 537 768 A1 | 6/2005 |
| EP | 2147588 A1 | 1/2010 |
| FR | 2 233 807 A5 | 1/1975 |
| WO | WO 2005/117564 A1 | 12/2005 |
| WO | 2012029003 A1 | 3/2012 |

\* cited by examiner

DUST PARTICLES SEPARATOR FOR SEEDING MACHINE

CROSS REFERENCE TO RELATED APPLICATION

This application is a 35 USC §371 application of International PCT Patent Application No. PCT/EP2013/054997, filed on Mar. 12, 2013, and further claims priority from EP 12160851.7, filed Mar. 22, 2012 and DE 20 2012 101 029.1, filed Mar. 22, 2012; the entire contents of each are hereby incorporated by reference herein in their entireties.

The present invention relates to a seeding machine for introducing seed material into a soil, comprising a first ploughing device for drawing at least one furrow into the soil and first filling means for closing the first furrow, furthermore comprising a dust separator through which air that is sucked in during the seeding process and contains dust particles can be separated into an air component and a dust component. The present invention also relates to a seeding method.

Seeding machines, which are also known as seed drills, are used in agriculture for introducing seed material into the soil. They comprise small seed coulters or plough-shares that create furrows to a depth of several centimetres into the arable soil. The seeds, which are stored in a feeding hopper, are fed into these trenches or furrows. Then the furrows are closed again by means of a trailing filling means, for example by means of a so-called harrow. The advantage of these agricultural machines for sowing plant seeds lies in the exact and uniform depth placement of the seed material, which leads to smaller loss due to birds feeding on it and to a more uniform emergence, as compared with wide-spread sowing, in which the seeds are distributed in a sweeping or random manner over the entire arable crop land area.

Moreover, the use of plant protection products in the form of chemical or biological substances for supporting plant growth is common practice. Primarily, these are insecticides for protection against sucking and feeding insects and fungicides for protection against fungal pathogens. These plant protection products are frequently applied by spraying. However, this can only reach the seedling which has already taken root, so that certain plant diseases that occur already in the initial stage of growth or insect pest that attack the emerging seedling cannot be treated efficiently.

In order to protect the seed material and the germinating seedling against fungi, bacteria and insects, the seed material is therefore treated with so-called seed treatment agents. In the process, the respective active substance or active substance combination is directly applied to the seeds in the form of a coating and thus forms a protective shell around each individual seed. In addition to the actual active substances that have a fungicidal and/or insecticidal effect, the seed treatment agent moreover generally comprises adhesion promoters for improving the adhesion of the active substances to the seed, as well as dispersants and colorants. Because each seed or each plant is supplied on-site with the correct dose of the required plant protection product by means of seed treatment, a quantity of active substances which is relatively small compared to application by spraying is sufficient in order to protect effectively the germinating seedling or the plant. Therefore, this method is advantageous also with regard to aspects of environmental protection.

When handling seed material that has been coated in this manner, an inevitable partial abrasive removal of the plant protection product occurs during the seed treatment production and handling processes as well as during the subsequent seeding process. In particular, in the case of pneumatic seeding machines in which a negative pressure is applied to a metering device for controlled introduction of the seed material into the soil, the seed treatment dust is vented into the atmosphere in a certain manner. The fine dust also deposits on the seeding machine and can lead to undesirable deposits and soiling, a possible hazard to the operator of the equipment.

Venting the plant protection agent dust out from the seeding machine is problematic in that this more or less uncontrolled release into the environment may constitute a danger to humans and animals, in particular to insects. For example, Clothianidin ((E)-1-(2-chloro-1,3-thiazol-5-ylmethyl)-3-methyl-2-nitroguanidine) is one of many active substances used in various plant protection products and seed treatment agents, some of which are suspected of being toxic to pollinating insects, which are included among the beneficial insects, particularly if the active ingredient is released into the environment in the form of the aforementioned plant protection product dust.

It is already known how to prevent, by means of mechanical devices, the dust which escapes the machine generally finely dispersed in an air flow particularly in the case of pneumatic seeding machines, from being ejected up into the air as it escapes the machine. For example, the so-called deflectors, which are used for reducing the air flow velocity, also have the effect that the escaping dust is guided in the direction of the arable soil. However, this measure has only a limited effect, in particular with regard to insects and other animals, which are now exposed to the dust that now lies on the arable soil. Furthermore, the smaller seed treatment particles may remain in the air due to the wind and the airstream in which they are ejected from the machine.

Therefore, there are already efforts to work the escaping plant protection product dust into the soil and thus to further limit its availability. DE 10 2008 037 782 A1 describes a pneumatic seeding machine in which escaping air that is mixed with dust or seed treatment particles is captured by collecting devices and worked into furrows in the soil by components of the seeding machine. However, the air component is not separated from the dust component in this seeding machine, so that depositing the dust and working it into the soil can only have limited success.

Therefore, the object of the present invention is to provide a seeding machine which enables the plant protection product dusts escaping a seeding machine to be processed in such a way that the danger they pose to humans and animals, in particular to insects, is significantly reduced.

This object is achieved with a seeding machine having the features of claim 1.

Advantageous embodiments and developments of the invention are the subject matter of the dependent claims.

The invention is characterised in that introducing means for introducing the dust component separated from the air component into the soil are provided in a seeding machine comprising a dust separator.

In other words, it is provided according to the invention that the dust component, which has already been separated from the air component in the seeding machine by means of a dust separator, is worked into the soil. The dust component is introduced into a furrow or the like in such a way that the dust particles are bound up in the soil due to the subsequent filling of the furrow and thus no longer lie on the soil surface freely accessible to insects or other animals, and also cannot be carried away by the wind. The air ejected from the dust separator is almost dust free and the dust reaching the soil surface is not carried by a fast moving airstream—the air component and the dust component having been largely separated. Hence, the dust component can be combined into the soil in the furrow with the minimum of displacement by any airstream, significantly reducing the likelihood of the dust leaving the drilled crop area. This is significant in particular with regard to such particle dusts that contain active substances such as, for example, Clothianidin, and that are suspected of being toxic to certain insects.

Among the above mentioned Clothianidin, other active substances within the dust component can be separated from the air component. Examples for insecticides are given in the following, non-closing list: Abamectin, Acephate, Acetamiprid, Acrinathrin, Alpha-Cypermethrin, Beta-Cyfluthrin, Bifenthrin, Buprofezin, Chlorantraniliprole, Chlorfenapyr, Chlorpyrifos, Carbofuran, Cyantraniliprole, Cyenopyrafen, Cyflumentofen, Cyfluthrin, Cypermethrin, Deltamethrin, Diafenthiuron, Dinotefuran, Emamectin-benzoate, Ethiprole, Fenpyroximate, Fipronil, Flometoquin, Flubendiamide, Fluensulfone, Fluopyram, Flupyradifurone, Gamma-Cyhalothrin, Imidacloprid, Indoxacarb, Lambda-Cyhalothrin, Lufenuron, Metaflumizone, Methiocarb, Methoxyfenozide, Milbemectin, Profenofos, Pyflubumide, Pyrifluquinazone, Spinetoram, Spinosad, Spirodiclofen, Spiromesifen, Spirotetramate, Sulfoxaflor, Tebufenpyrad, Tefluthrin, Thiacloprid, Thiamethoxam, Thiodicarb, Triflumuron, 1-(3-chloropyridin-2-yl)-N-[4-cyano-2-methyl-6-(methylcarbamoyl)phenyl]-3-{[5-(trifluoromethyl)-1H-tetrazol-1-yl]methyl}-1H-pyrazole-5-carboxamide, 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide, 1-{2-fluoro-4-methyl-5-[(2,2,2-trifluorethyl)sulfinyl]phenyl}-3-(trifluoromethyl)-1H-1,2,4-triazol-5-amine and Afidopyropen. A non-closing list for fungicides comprises: Carbendazim, Carboxin, Difenoconazole, Fludioxonil, Fluquinconazole, Fluxapyroxad, Ipconazole, Isotianil, Mefenoxam, Metalaxyl, Pencycuron, Penflufen, Prothioconazole, Prochloraz, Pyraclostrobin, Sedaxane, Silthiofam, Tebuconazole, Thiram, Trifloxystrobin, and Triticonazole.

According to one embodiment of the invention, the seeding machine is a pneumatic seeding machine comprising a metering device to which a negative pressure can be applied for the controlled placement of the seed material into the first furrow. Such a metering device can be configured, for example, as a rotating holed disc (perforated disc) with a negative pressure applied on one side thereof, whereby seeds on the other side of the perforated disc are picked up from a seed material reservoir. In this case, the holes in the disc have to be of such a size that the seeds, for example maize grains, are attached to but unable to pass through the holes. Rather, due to the negative pressure applied, individual seeds adhere to the disc in the region of the holes. When the disc rotates, it passes through a certain narrow circular segment in which the negative pressure ceases abruptly. The seed which at that moment lies in this circular segment then falls off the perforated disc and falls on the soil or into the previously created furrow. In this way, an individual placement of the seeds into the soil is possible in a very exact manner. Due to the negative pressure applied in such pneumatic seeding machines, any dust associated with the seed treatment is extracted from the seeds. It should be noted that the airstream that contains the dust is indispensable for maintaining the functionality of the machine.

In another embodiment of the seeding machine, according to the invention, the dust separator comprises a centrifugal separator. Centrifugal separators, which are also referred to as cyclones or cyclone separators, are used for separating particles contained in gases or liquids (hydrocyclones).

A centrifugal separator substantially consists of a feed cylinder, a tapering cone, a particle collecting container as well as an air outlet duct. In the feed cylinder, the gas-particle mixture is put on a circular trajectory by being blown in tangentially. Due to the taper of the adjacent cone, the rotational speed increases to such an extent that the particles are thrown against the cone walls by the centrifugal force and are decelerated to such an extent that they disengage from the flow and fall downwards into the collecting container. The gas which has been cleaned of the particles leaves the cone in an upward direction through the air outlet duct. In particular, in pneumatic seeding machines, such a centrifugal separator enables a particularly effective separation of the air fraction from the dust fraction.

The centrifugal separator can be classified into the group of inertial separators in which the dust component is separated by centrifugal, gravitational, and/or intertial forces. These forces move the dust particles to an area where the forces exerted by the stream of the air to be cleaned are minimal. The separated dust particles normally are moved by gravity into the collecting container. Of course, the seeding machine according to the invention can also comprise other types of dust separators.

For instance, the dust separator according to the invention can also belong to the group of fabric filters. Fabric filters or fabric dust separators use filtration to separate dust particles from the fluid containing such particles. The fluid passes through fabric elements or fabric bags that act as filters. The bags can be made from cotton, synthetic or glass-fibre material in, for instance, a tube- or envelope-shape. After a certain time the fabric bags have to be cleaned or removed as the accumulation of the dust particles decreases their efficiency. There are different methods to separate the dust particles from the fabric bags. For example, a high pressure blast or pulse jet can be used to remove dust from the bag (fabric filter with pulse jet cleaning). The bags can alternatively or additionally also be cleaned by sonic waves (fabric filter with sonic cleaning). In order to enlarge the active area of the fabric means, cartridges can be used.

Also the dust separator can be configured as an electrostatic precipitator. An electrostatic precipitator uses electrostatic forces to separate dust particles from the dust-containing air. The dust-containing air flows through a passage formed by discharge and collecting electrodes. The electrodes can have the shape of a plate or a tube. For separating the accumulated dust from the collecting electrodes, different cleaning methods such as pulse jet cleaning can be used In one embodiment of the invention, the removal of the dust component from the dust separator can be regulated by means of a rotary valve. This may be, for example, a vane lock or the like. Such a valve may comprise, for example, several segments configured as chambers, with each segment or each chamber being able to receive and also release again a defined partial quantity of the particle dust. An even, continuous or quasi-continuous discharge of the seed treatment dust is thus ensured.

Alternatively, the removal of the dust component can also be regulated through at least one slide gate valve. However, it should be noted that a single gate valve is not optimal as there is a risk that the airflow through the dust separator can be disrupted and its efficiency impaired. Use of a single valve may also permit excessive air to be carried with the dust which may result in inadequate incorporation of the dust in the soil.

By combining two slide gate valves connected in series, by opening the first slide gate valve while the second slide gate valve is closed at the same time, a defined partial quantity of the dust can first be admitted into the space between the two slide gate valves, before the first slide gate valve is then closed and the second slide gate valve is opened, so that the particle dust can then escape. In this manner, the metering of the particle dust during the removal from the dust separator can be set very exactly. By setting the frequency with which the valves open and close, both a quasi-continuous as well as a timed dust discharge can be achieved. Discharge of the dust through such a lock system furthermore ensures that the system is sufficiently air-tight and that there is no influence from the outside interfering with the pressure conditions in the dust separator.

One proposal of the invention provides that the dust component separated from the air component can be introduced into the first furrow which receives the seed material. In this way, both the seed material and the particle dust are worked into the same furrow. In principle, given a corresponding configuration of the seeding machine, several, preferably parallel first furrows can also be drawn, to each of which a metering device is assigned, so that the seed material can be introduced into several first furrows simultaneously. Accordingly, the dust particles can also be discharged into the several first furrows in this case.

Another proposal of the invention provides that the seeding machine comprises a second ploughing device for drawing at least one second furrow into the soil, into which the dust component separated from the air component can be introduced, preferably without the seeds. Again, several first and/or several second, preferably respectively parallel furrows can also be drawn. In this case, a first seeding furrow and a second dust disposal furrow can respectively be alternately arranged. However, in this variant embodiment, in which the seed material and the dust component are worked into separate furrows, there would be a higher power consumption because drawing the furrows makes up a substantial part of the energy consumption of a seeding machine.

If the seeding machine is equipped with a second ploughing device for drawing second furrows, it preferably also comprises a second filling means for closing the second furrow. Only this ensures that the particle dust is really bound to the soil and does not lie on the soil freely accessible to insects or that it can be carried away by the wind.

The introducing means for introducing the dust component into the soil are preferably configured as pipes or tubes so that they run into the previously drawn furrows very precisely and are able there to discharge the dust particles in a controlled manner. In this case, the soil ends of the introducing means can run within the furrows and thus lie beneath the level of the arable soil. In this manner, the dust particles can be placed very precisely. The introducing means like pipes or tubes delivering the dust to the furrow can also run through the body of the furrow filling device, giving further protection of the dust from any wind.

The introducing means (for instance the pipes or tubes), the rotary valve, and/or the slide gate valve can be made from plastic or other suitable materials. The materials can be electrically conductive to prevent electrostatic charging, leading to the risk that the dust particles stick at the inner surface of the introducing means and the valves, respectively. If, for instance, plastic is used as material, additives like carbon can contribute to a sufficient conductivity. The avoiding of stuck dust particles within the introducing means or valves facilitates the dust discharge in the soil and prevents unintended release of large amounts of material at once because of, e.g., vibrations of the sowing machinery.

Also a flushing device can be used in order to facilitate the dust discharge into the soil and to increase the efficiency. For instance, the rotary valve can be coupled to another valve connected to a water container. During the sowing operation, a small amount of water can be released through the introducing means continuously or in regular intervals, thus flushing fine dust particles into the soil.

The invention also provides a seeding method. The seeding method according to the invention introduces the seed material into the soil in which dust particles produced during the seeding process are first separated from the air component in the dust separator. The separated dust particles are then discharged from the dust separator and introduced into the soil. In the process, the dust particles are preferably introduced into the furrow in the soil, with the furrow being subsequently closed again. The furrow can be the first furrow receiving the seed material as well as a separately drawn second furrow. Preferably, the seeding machine and its embodiments described above, respectively, are used in the seeding method.

The seeding machine and/or the seeding method according to the invention can be used for attaining different objectives. It could be advantageous to separate the air containing the dust particles from the seed material by—for instance—introducing the dust component into a furrow which is different to the furrow into which the seed material is worked. Also, by using the seeding machine and/or the seeding method, not only the exposure of animals (particular beneficials like bees or bumblebees) to active substances that are suspected of being toxic for animals but also the exposure of the seeding machine operator or persons living or working adjacent to the field into which the seed material are worked to chemicals potentially harmful for humans can be reduced.

The invention will be explained in more detail below with reference to an exemplary embodiment and to the attached drawings. In the Figures:

FIG. 1: shows a detail of a seeding machine according to the invention in a schematic cross-sectional view;

FIG. 2: shows an alternative embodiment of a valve of the seeding machine from FIG. 1;

FIG. 3: shows an enlarged illustration of the centrifugal separator from FIG. 1 which shows its functional principle.

FIG. 1 shows a detail from a seeding machine according to the invention, which is referred to in its entirety by 1. Only that part of the seeding machine 1 is shown here which exhibits the innovations according to the invention with regard to the separation of an air from a dust component of an air-particle mixture as well as the introduction of the dust component into the soil. The basic structure of the actual seeding machine, in particular a pneumatic seeding machine, is known to the person skilled in the art and is not the subject matter of the present invention.

A centrifugal separator 5, also referred to as cyclone, is provided in the exemplary embodiment shown in FIG. 1 for separating the air component from the dust component. A fan 3 extracts the air-particle mixture from the seeding machine 1 via an inlet 2 and blows it into the cyclone 5 via a feed 4.

The cyclone 5 has a lower conically tapering region 6 which leads into an outlet region 7. The mode of operation of the cyclone 5 becomes apparent by referring to the more detailed illustration in FIG. 3. The particle-air mixture P, which is introduced into the cyclone 1 via the feed and depicted by a dashed line, is brought into a circular or helical trajectory S by being blown in tangentially. Due to the taper of the cyclone 5 in a lower area 6, the rotational speed increases to such an extent that the particles are thrown against the walls of the cyclone 5 by the occurring centrifugal force and are thereby decelerated to such an extent that they disengage from the flow and trickle downwards into the outlet region 7. The purified air, i.e., the air component, in contrast rises up and is able to leave the cyclone 5 via the air outlet duct 13.

For removing in a controlled manner the particle dust collecting in the outlet region 7 of the cyclone 5, the seeding machine, according to the exemplary embodiment shown in FIG. 1, comprises two slide gate valves 8a, 8b, with the slide gate valves 8a, 8b enclosing between them a space 9. Within the context of a corresponding regulating process, a predefined quantity of particle dust can be admitted into this space 9 from the outlet region 7 by opening only the upper slide gate valve 8*a,* before the slide gate valve 8*a* is then closed and the lower slide gate valve 8*b* opened, so that the particle dust can be discharged from the seeding machine via tube-like lines 10 that follow the slide gate valve 8*b* and feed into the arable soil 11. The frequency or timing with which the slide gate valves 8*a* and 8*b* open and close is variably adjustable and can also be adapted, in particular, to the travelling speed of the seeding machine. For example, relatively short opening times of the two valves lead to a quasi-continuous discharge of small quantities of dust. In this case, opening times of a few seconds, for example of about 2 to 60 seconds, for each valve are conceivable. However, longer opening or closing times can also be in the range of one to several minutes.

As an alternative to the above-described two slide gate valves 8*a*, 8*b*, FIG. 2 shows a rotary valve 8 configured as a vane lock which can also be used for regulating the dust discharge from the cyclone 5. For this purpose, the rotary valve 8 comprises individual chambers configured in the shape of a circle segment, which, depending on the rotational state of the rotary valve 8, fill with particle dust from the outlet region 7 and successively discharge it again after about a half rotation of the valve, as is also apparent from FIG. 3.

Indicated schematically, FIG. 1 also shows a metering device 12 configured as a rotating perforated disc, for introducing the seeds into the soil 11, which moves along a furrow which is shown in FIG. 1 in a longitudinal section and extends from the left to the right. In the embodiment of the invention shown in this Figure, the particle dust, i.e., the dust component is thus deposited in the same furrow as the seed material. What is not shown is the ploughing device which precedes the metering device 12 and draws furrows into the soil, as well as the filling means that follow the tube-like lines 10 and close the furrows again. The way the air is guided from the metering organ 12 to the air inlet 2 of the fan 3 is indicated by means of the arrow 14.

Using the seeding machine according to the invention allows seed treatment dust to be reliably captured and be efficiently worked into the arable soil: therefore, any danger this dust poses to humans, animals or environment can thus be significantly reduced. A seeding machine configured in this way thus is particularly suitable for sowing seed material treated with a seed treatment agent containing active substances such as, for example Clothianidin, and some of these active substances are suspected of having a toxic effect on certain insects by releasing plant protection products into the environment as dust.

A field on which work is to be done is supplied with substantially the same quantity of plant protection product by the seeding machine according to the invention as would also be the case without abraded seed treatment agent, so that existing limits for the plant protection product output will not be exceeded. With regard to compliance with such limits, it is in this case irrelevant whether the plant protection product is introduced into the soil while adhering to the seed or as abraded dust. Moreover, the continuous or quasi-continuous removal of the dust component during the sowing process ensures that no local plant protection product build-up occur which may possibly be problematic with regard to aspects of environmental protection.

The invention claimed is:

1. Seeding machine (1) for introducing seeds treated with a seed treatment into a soil (11), comprising:

a first ploughing device adapted to draw at least one furrow into the soil (11);

a metering device (12) adapted to introduce the seeds into the at least one furrow;

a filling device adapted to close the at least one furrow;

a dust separator adapted to separate air containing dust particles associated with the seed treatment into an air component and a dust component;

a fan (3) comprises an inlet (2) connected with the metering device (12) and a feed (4) connected with the dust separator, wherein the fan generates a negative pressure, the negative pressure is applied via the inlet (2) to the metering device, and the negative pressure extracts dust particles from the seeds and the fan (3) blows the air containing the dust particles via the feed (4) into the dust separator; and a line (10) extending from the dust separator and that introduces the dust component separated from the air component into the soil (11).

2. Seeding machine (1) according to claim 1, wherein the negative pressure is applied for a controlled introduction of the seed material into the at least one furrow.

3. Seeding machine according to claim 2, wherein the dust separator comprises a centrifugal separator.

4. Seeding machine according to claim 3, wherein the centrifugal separator comprises an air outlet duct through which the air component separated from the dust component escapes into the environment.

5. Seeding machine according to claim 2, further comprising a rotary valve configured to regulate the removal of the dust component.

6. Seeding machine according to claim 2, wherein the dust component separated from the air component is introduced into the first furrow which receives the seed material.

7. Seeding machine (1) according to claim 1 wherein the dust separator comprises a centrifugal separator (5).

8. Seeding machine (1) according to claim 7, wherein the centrifugal separator (5) comprises an air outlet duct (13) through which the air component separated from the dust component escapes into the environment.

9. Seeding machine (1) according to claim 1 wherein the removal of the dust component from the dust separator is regulated by a rotary valve (8).

10. Seeding machine (1) according to claim 1 wherein the removal of the dust component from the dust separator is regulated by at least one slide gate valve (8*a*, 8*b*).

11. Seeding machine (1) according to claim 1 wherein the dust component separated from the air component can be introduced into the at least one furrow which receives the seed material.

12. Seeding machine (1) according to claim 1, wherein the line (10) introducing the dust component into the soil (11) comprises a pipe or a tube.

13. Seeding method for introducing seed material into the soil, comprising:

separating dust particles produced during a seed treatment process from an air component in a dust separator;

discharging the separated dust particles from the dust separator and into the soil through a discharge line; and introducing the seed material into the soil by a metering device separate from the discharge line.

14. Seeding method according to claim 13, wherein the dust separator comprises a centrifugal separator (5).

15. Seeding method according to claim 13, comprising using a seeding machine (1), the seeding machine comprising a first ploughing device for drawing at least one furrow into the soil (11) and a filling device for closing the at least one furrow, the dust separator through which air that is aspired during the seeding process and that contains dust particles is separated into the air component and the dust particles, and the discharge line (10) for introducing the dust particles separated from the air component into the soil (11).

16. Seeding method according to claim 15, further comprising regulating removal of the dust particles from the dust separator with at least one slide gate valve.

17. Seeding method according to claim 15, wherein the dust separator comprises a centrifugal separator.

18. Seeding method according to claim 14, comprising using a seeding machine the seeding machine comprising a first ploughing device for drawing at least one furrow into the soil and a filling device for closing the at least one furrow, the dust separator through which air that is aspired during the seeding process and that contains dust particles is separated into the air component and the dust particles, and the discharge line for introducing the dust particles separated from the air component into the soil.

* * * * *